US012722315B2

(12) United States Patent
Turpin et al.

(10) Patent No.: US 12,722,315 B2
(45) Date of Patent: Sep. 1, 2026

(54) PERCEPTION MODULE FOR A MOBILE MANIPULATOR ROBOT

(71) Applicant: Boston Dynamics, Inc., Waltham, MA (US)

(72) Inventors: Matthew Turpin, Newton, MA (US); Alex Perkins, Lincoln, MA (US); Michael Murphy, Carlisle, MA (US); Liam Mulshine, Cambridge, MA (US); Arash Ushani, Cambridge, MA (US); Benjamin Zelnick, Newton, MA (US)

(73) Assignee: Boston Dynamics, Inc., Waltham, MA (US)

( * ) Notice: Subject to any disclaimer, the term of this patent is extended or adjusted under 35 U.S.C. 154(b) by 677 days.

(21) Appl. No.: 17/699,524

(22) Filed: Mar. 21, 2022

(65) Prior Publication Data

US 2022/0305680 A1 Sep. 29, 2022

Related U.S. Application Data

(60) Provisional application No. 63/166,747, filed on Mar. 26, 2021.

(51) Int. Cl.
*B25J 19/02* (2006.01)
*B25J 5/00* (2006.01)
(Continued)

(52) U.S. Cl.
CPC ............. *B25J 19/023* (2013.01); *B25J 9/162* (2013.01); *B25J 9/1664* (2013.01); *B25J 9/1697* (2013.01); *B25J 19/06* (2013.01); *B25J 5/007* (2013.01)

(58) Field of Classification Search
CPC ........ B25J 19/023; B25J 9/162; B25J 9/1664; B25J 9/1697; B25J 19/06; B25J 5/007;
(Continued)

(56) References Cited

U.S. PATENT DOCUMENTS 4,789,295 A 12/1988 Boucher, Jr. et al.
6,588,574 B2 7/2003 Koini et al.
(Continued)

FOREIGN PATENT DOCUMENTS

CN 109074082 A 12/2018
EP 2571660 B1 8/2018
(Continued)

OTHER PUBLICATIONS

"Zhi Yan, Multisensor Online Transfer Learning for 3D LiDAR-based Human Detection with a Mobile Robot, Jan. 2018, Research Gate" (Year: 2018).*

(Continued)

*Primary Examiner* — Wade Miles
(74) *Attorney, Agent, or Firm* — Pierce Atwood LLP

(57) ABSTRACT

An imaging apparatus includes a structural support rigidly coupled to a surface of a mobile robot and a plurality of perception modules, each of which is arranged on the structural support, has a different field of view, and includes a two-dimensional (2D) camera configured to capture a color image of an environment, a depth sensor configured to capture depth information of one or more objects in the environment, and at least one light source configured to provide illumination to the environment. The imaging apparatus further includes control circuitry configured to control a timing of operation of the 2D camera, the depth sensor, and the at least one light source included in each of the plurality of perception modules, and at least one computer processor configured to process the color image and the depth information to identify at least one characteristic of one or more objects in the environment.

29 Claims, 13 Drawing Sheets

(51) Int. Cl.
*B25J 9/16* (2006.01)
*B25J 19/06* (2006.01)

(58) Field of Classification Search
CPC .......... G01B 11/24; G05B 2219/40282; G05B 2219/40298; G05B 2219/37425; G05B 2219/37571; G05B 2219/40565; G05B 2219/40594
See application file for complete search history.

(56) References Cited

U.S. PATENT DOCUMENTS

| | | | |
|---|---|---|---|
| 7,153,085 | B2 | 12/2006 | Clark et al. |
| 8,295,980 | B2 | 10/2012 | Williamson |
| 8,965,563 | B2 | 2/2015 | Eldershaw et al. |
| 9,004,846 | B2 | 4/2015 | La Rovere et al. |
| 9,089,969 | B1 | 7/2015 | Theobald |
| 9,102,053 | B2 | 8/2015 | Suzuki |
| 9,233,470 | B1 | 1/2016 | Bradski et al. |
| 9,434,558 | B2 | 9/2016 | Criswell |
| 9,451,810 | B2 | 9/2016 | Regan et al. |
| 9,481,530 | B2 | 11/2016 | Brandmüller et al. |
| 9,487,361 | B2 | 11/2016 | Girtman et al. |
| 9,493,316 | B2 | 11/2016 | Girtman et al. |
| 9,503,704 | B2 | 11/2016 | Ando |
| 9,507,995 | B2 | 11/2016 | Konolige et al. |
| 9,519,882 | B2 | 12/2016 | Galluzzo et al. |
| 9,604,363 | B2 | 3/2017 | Ban |
| 9,688,489 | B1 | 6/2017 | Zevenbergen et al. |
| 9,694,498 | B2 | 7/2017 | Konolige |
| 9,744,669 | B2 | 8/2017 | Wicks et al. |
| 9,875,911 | B2 | 1/2018 | Pagaila et al. |
| 9,919,872 | B2 | 3/2018 | Khodl et al. |
| 9,940,604 | B2 | 4/2018 | Galluzzo et al. |
| 9,969,573 | B2 | 5/2018 | Girtman et al. |
| 9,987,746 | B2 | 6/2018 | Bradski et al. |
| 10,005,627 | B2 | 6/2018 | Girtman et al. |
| 10,071,856 | B2 | 9/2018 | Hance et al. |
| 10,108,185 | B1 | 10/2018 | Theobald |
| 10,122,995 | B2 | 11/2018 | Rublee et al. |
| 10,124,489 | B2 | 11/2018 | Chitta et al. |
| 10,124,967 | B2 | 11/2018 | Girtman et al. |
| 10,147,069 | B2 | 12/2018 | Galluzzo et al. |
| 10,216,865 | B1 | 2/2019 | Theobald |
| 10,239,210 | B2 | 3/2019 | Morency et al. |
| 10,343,857 | B2 | 7/2019 | Morency et al. |
| 10,417,521 | B2 | 9/2019 | Dong |
| 10,518,973 | B2 | 12/2019 | Hance et al. |
| 10,661,444 | B2 | 5/2020 | McCollum et al. |
| 10,766,149 | B2 | 9/2020 | Marchese et al. |
| 10,793,047 | B1 | 10/2020 | Theobald |
| 2006/0182607 | A1 | 8/2006 | Clark et al. |
| 2013/0010066 | A1 | 1/2013 | Olivier, III et al. |
| 2013/0017053 | A1 | 1/2013 | Forget et al. |
| 2013/0231779 | A1 | 9/2013 | Purkayastha et al. |
| 2014/0079524 | A1 | 3/2014 | Shimono et al. |
| 2015/0066199 | A1 | 3/2015 | Shimono |
| 2016/0221187 | A1 | 8/2016 | Bradski et al. |
| 2018/0222695 | A9 | 8/2018 | Girtman et al. |
| 2020/0376689 | A1* | 12/2020 | Rembisz ................ B25J 9/1617 |
| 2020/0398433 | A1 | 12/2020 | Kelly et al. |
| 2021/0089040 | A1* | 3/2021 | Ebrahimi Afrouzi ........................ A47L 9/2873 |

FOREIGN PATENT DOCUMENTS

| | | | |
|---|---|---|---|
| WO | 1998051598 | A1 | 11/1998 |
| WO | 2014041318 | A1 | 3/2014 |
| WO | 2014111633 | A1 | 7/2014 |
| WO | 2014113762 | A1 | 7/2014 |
| WO | 2014186781 | A1 | 11/2014 |
| WO | 2015017444 | A1 | 2/2015 |
| WO | 2015035300 | A1 | 3/2015 |
| WO | 2015187975 | A1 | 12/2015 |
| WO | 2016014917 | A1 | 1/2016 |
| WO | 2016033172 | A1 | 3/2016 |
| WO | 2017146895 | A1 | 8/2017 |
| WO | 2018022265 | A1 | 2/2018 |
| WO | 2019219659 | A1 | 11/2019 |
| WO | 20190219659 | A1 | 11/2019 |
| WO | 2010034044 | A2 | 4/2020 |

OTHER PUBLICATIONS

International Search Report and Written Opinion mailed Sep. 1, 2022, in connection with International Application No. PCT/US2022/021141.

International Preliminary Report on Patentability for International Application No. PCT/US2022/021141 dated Sep. 12, 2023; 17 pages.

* cited by examiner

PERCEPTION MODULE FOR A MOBILE MANIPULATOR ROBOT

CROSS-REFERENCE TO RELATED APPLICATIONS

This application claims priority under 35 U.S.C. § 119(e) to U.S. Provisional Application Ser. No. 63/166,747, filed Mar. 26, 2021, titled, "PERCEPTION MODULE FOR A MOBILE MANIPULATOR ROBOT," which is incorporated by reference in its entirety herein.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Some embodiments relate to an imaging apparatus configured to be coupled to a mobile robot. The imaging apparatus comprises a structural support rigidly coupled to a surface of the mobile robot, a plurality of perception modules, each of which is arranged on the structural support to have a different field of view and includes a two-dimensional (2D) camera configured to capture a color image of an environment, a depth sensor configured to capture depth information of one or more objects in the environment, and at least one light source configured to provide illumination to the environment. The imaging apparatus further includes control circuitry configured to control a timing of operation of the 2D camera, the depth sensor, and the at least one light source included in each of the plurality of perception modules, and at least one computer processor configured to process the color image and the depth information to identify at least one characteristic of one or more objects in the environment.

In one aspect, the depth sensor comprises a time-of-flight (TOF) camera. In another aspect, the depth sensor comprises a stereoscopic camera. In another aspect, the 2D camera comprises a red-green-blue (RGB) monocular camera. In another aspect, the structural support is configured to rotate relative to the surface of the robot, and the plurality of perception modules are configured to capture corresponding color images and depth information as the structural support rotates. In another aspect, the plurality of perception modules include a first perception module and a second perception module, and wherein the first perception module and the second perception module are arranged vertically along a same side of the structural support.

In one aspect, processing the color image and the depth information comprises registering the color image and the depth information to create a combined image, and identifying the at least one characteristic of one or more objects in the environment based, at least in part, on the combined image. In another aspect, registering the color image and the depth information comprises correcting for distortion in one or both of the color image and the depth information. In another aspect, identifying the at least one characteristic of one or more objects in the environment based, at least in part, on the combined image comprises providing the combined image as input to a statistical model trained to identify the at least one characteristic. In another aspect, the at least one characteristic includes one or more surfaces of the one or more objects in the environment. In another aspect, the mobile robot further comprises an arm coupled to the surface of the mobile robot, and the at least one computer processor is further configured to control an operation of the arm based, at least in part, on the identified at least one characteristic. In another aspect, the at least one computer processor is further configured to select, from among the one or more objects in the environment, a next object to interact with, and controlling an operation of the arm comprises controlling an operation of the arm to cause the arm to interact with the selected next object. In another aspect, the at least one computer processor is further configured to determine whether to interact with a top surface or a face surface of the selected next object, and controlling the operation of the arm comprises controlling an operation of the arm to cause the arm to interact with the determined top surface or face surface of the selected next object.

In one aspect, the 2D camera is electrically connected to the depth sensor and the at least one light source, the control circuitry is configured to trigger a start of operation of the 2D camera, and the 2D camera is configured to trigger a start of operation of the at least one light source and the depth sensor. In another aspect, the plurality of perception modules includes a first perception module and a second perception module, and wherein the control circuitry is configured to trigger a start of operation of one or more components within the first perception module at a first timepoint and trigger a start of operation of one or more components within the second perception module at a second timepoint after the first timepoint. In another aspect, triggering a start of operation of one or more components within the first perception module at a first timepoint and triggering a start of operation of one or more components within the second perception module at a second timepoint after the first timepoint comprises triggering the at least one light source of the first perception module at the first timepoint and triggering the at least one light source of the second perception module at the second timepoint. In another aspect, a time between the first timepoint and the second timepoint is between 50-100 ms. In another aspect, the environment comprises an inside of a container, and wherein the at least one characteristic comprises one or more of a side of the container and a top of the container.

In one aspect, the mobile robot further comprises an arm coupled to the surface of the mobile robot, and the environment includes the arm of the mobile robot. In another aspect, the at least one characteristic comprises one or more dimensions of an object coupled to an end effector of the arm of the mobile robot. In another aspect, the at least one computer processor is further configured to calibrate the mobile robot based, at least in part, on the identified at least one characteristic. In another aspect, calibrating the mobile robot comprises calibrating the arm of the mobile robot and/or calibrating one or more components of the each of the plurality of perception modules. In another aspect, the mobile robot further comprises an arm coupled to the surface of the mobile robot, and the environment does not include the arm of the mobile robot. In another aspect, the at least one light source comprises a plurality of light sources arranged to at least partially surround the 2D camera. In another aspect, the at least one light source is configured to output light in the visible spectrum, and wherein the depth sensor is configured to emit infrared light. In another aspect, the control circuitry is configured to control a timing of operation of the at least one light source and the depth sensor to start operating simultaneously.

Some embodiments relate to a method of imaging one or more objects in an environment of a mobile robot. The method comprises capturing with a first perception module having a first field of view, a first color image of the environment and first depth information for one or more objects in the environment, capturing with a second perception module having a second field of view, a second color image of the environment and second depth information for one or more objects in the environment, wherein the first field of view and the second field of view are different, processing the first color image, the first depth information, the second color image, and the second depth information to identify at least one characteristic of one or more objects in the environment, and controlling at least one operation of the mobile robot based, at least in part, on the identified at least one characteristic.

In one aspect, the method further comprises controlling an operation of the first perception module and the second perception module such that the first color image and the second color image are captured at different timepoints. In another aspect, processing the first color image, the first depth information, the second color image, and the second depth information comprises registering the first color image and the first depth information to generate a first combined image, registering the second color image and the second depth information to generate a second combined image, providing as input to a statistical model trained to identify the at least one characteristic, the first combined image and the second combined image, and identifying the at least one characteristic based, at least in part, on an output of the statistical model.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
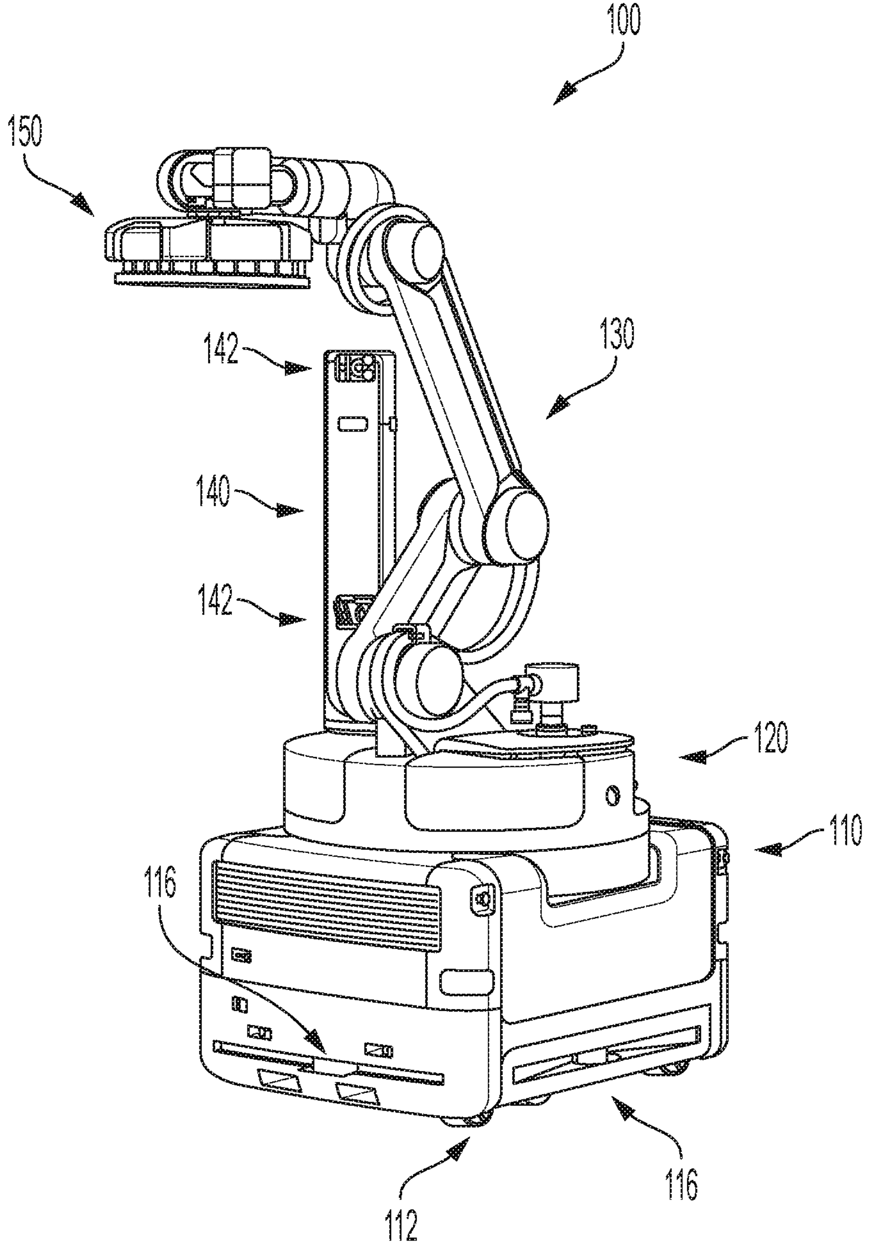
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialized robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

Figure 1B:
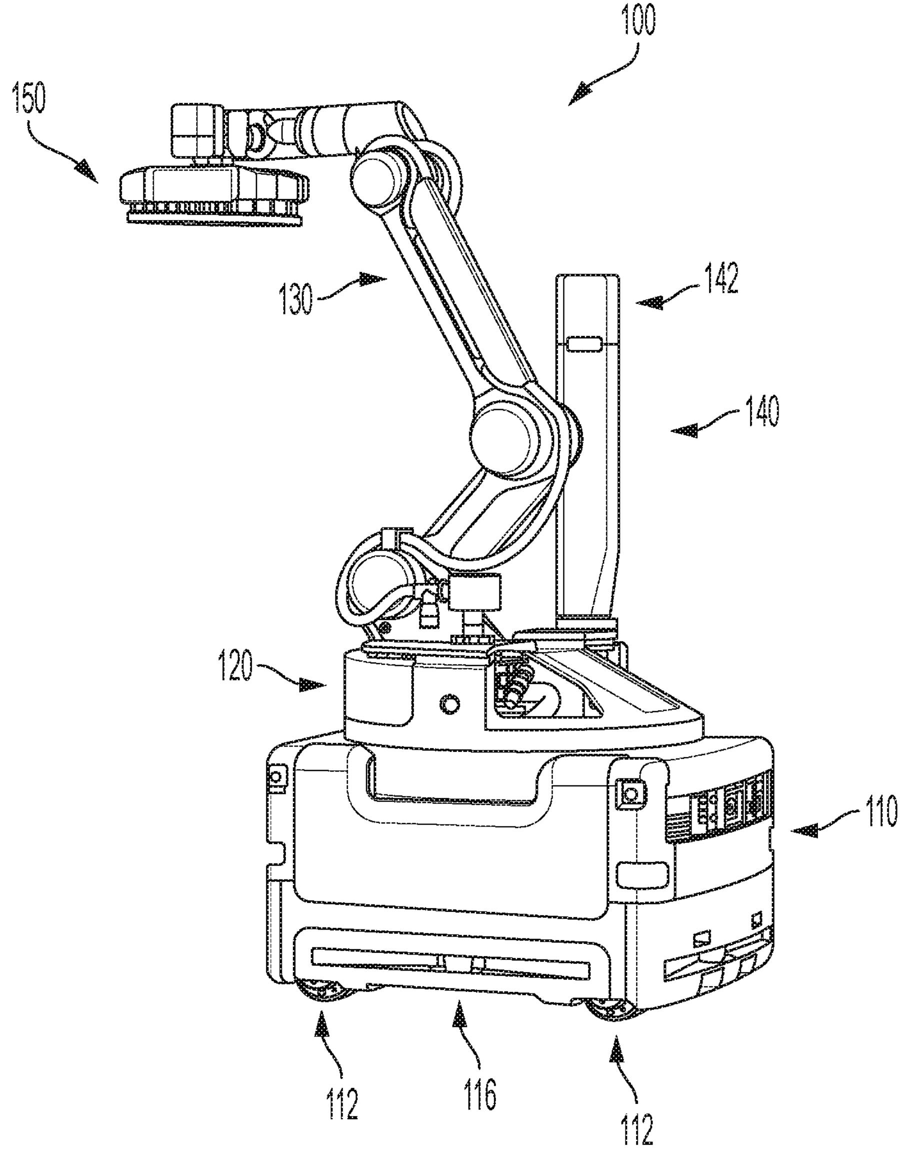
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 8A:
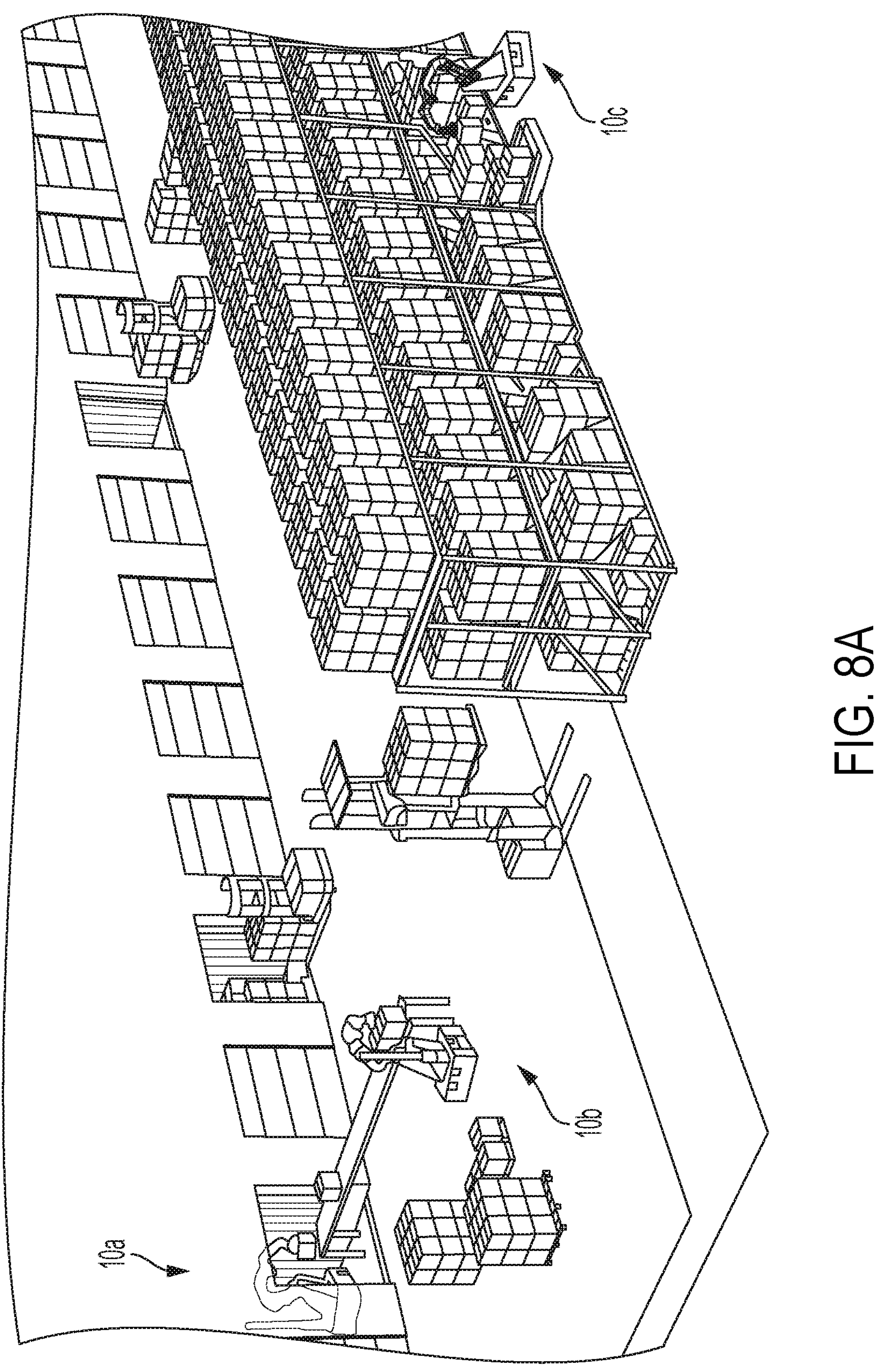
FIG. 8A depicts robots performing tasks in a warehouse environment.

FIG. 8A depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 8B). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 8C). It should be appreciated that the robots 10*a*, 10*b*, and 10*c* are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 8B:
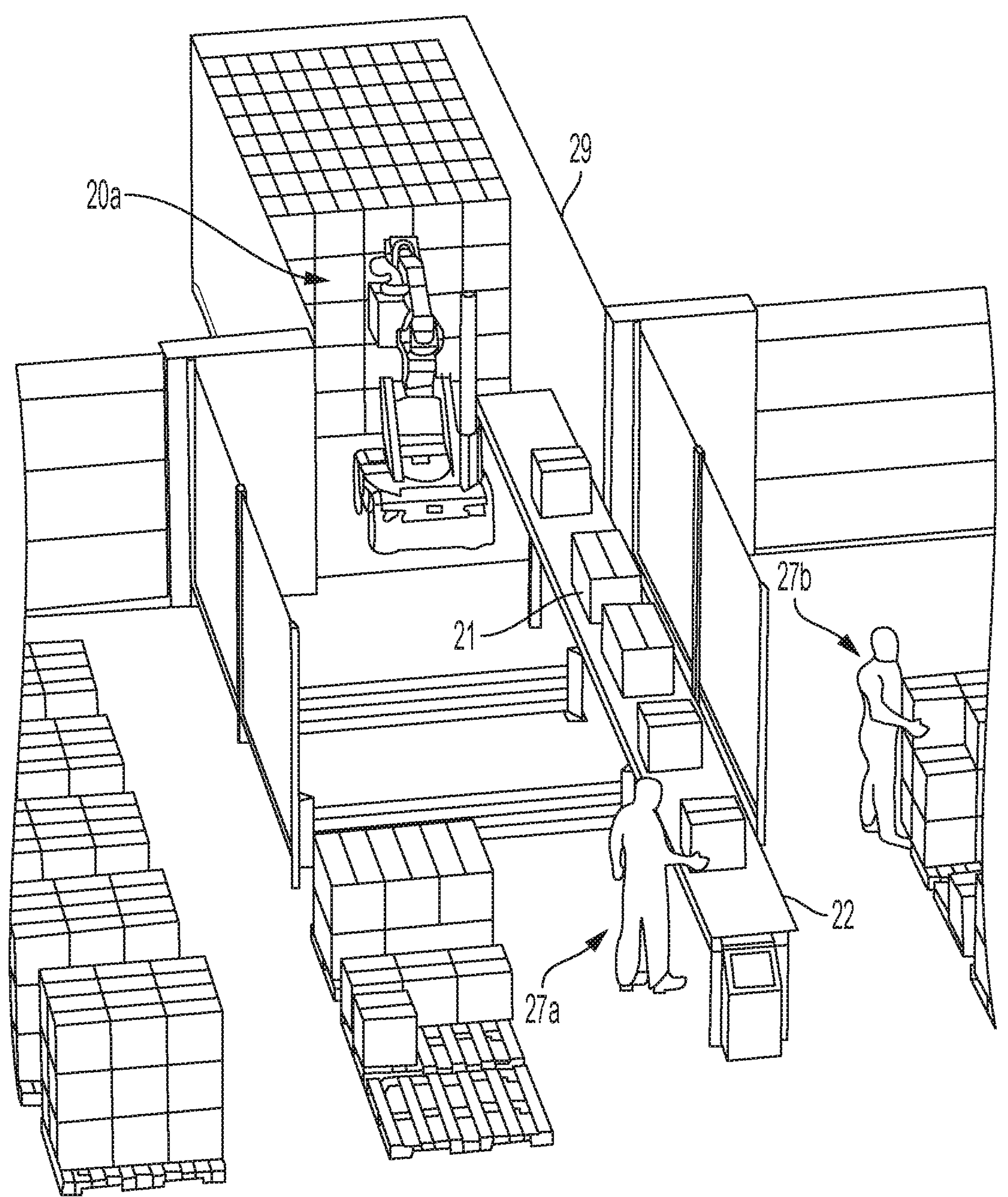
FIG. 8B depicts a robot unloading boxes from a truck.

FIG. 8B depicts a robot 20*a* unloading boxes 21 from a truck 29 and placing them on a conveyor belt 22. In this box picking application (as well as in other box picking applications), the robot 20*a* will repetitiously pick a box, rotate, place the box, and rotate back to pick the next box. Although robot 20*a* of FIG. 8B is a different embodiment from robot 100 of FIGS. 1A and 1B, referring to the components of robot 100 identified in FIGS. 1A and 1B will ease explanation of the operation of the robot 20*a* in FIG. 8B. During operation, the perception mast of robot 20*a* (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 8B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 8C:
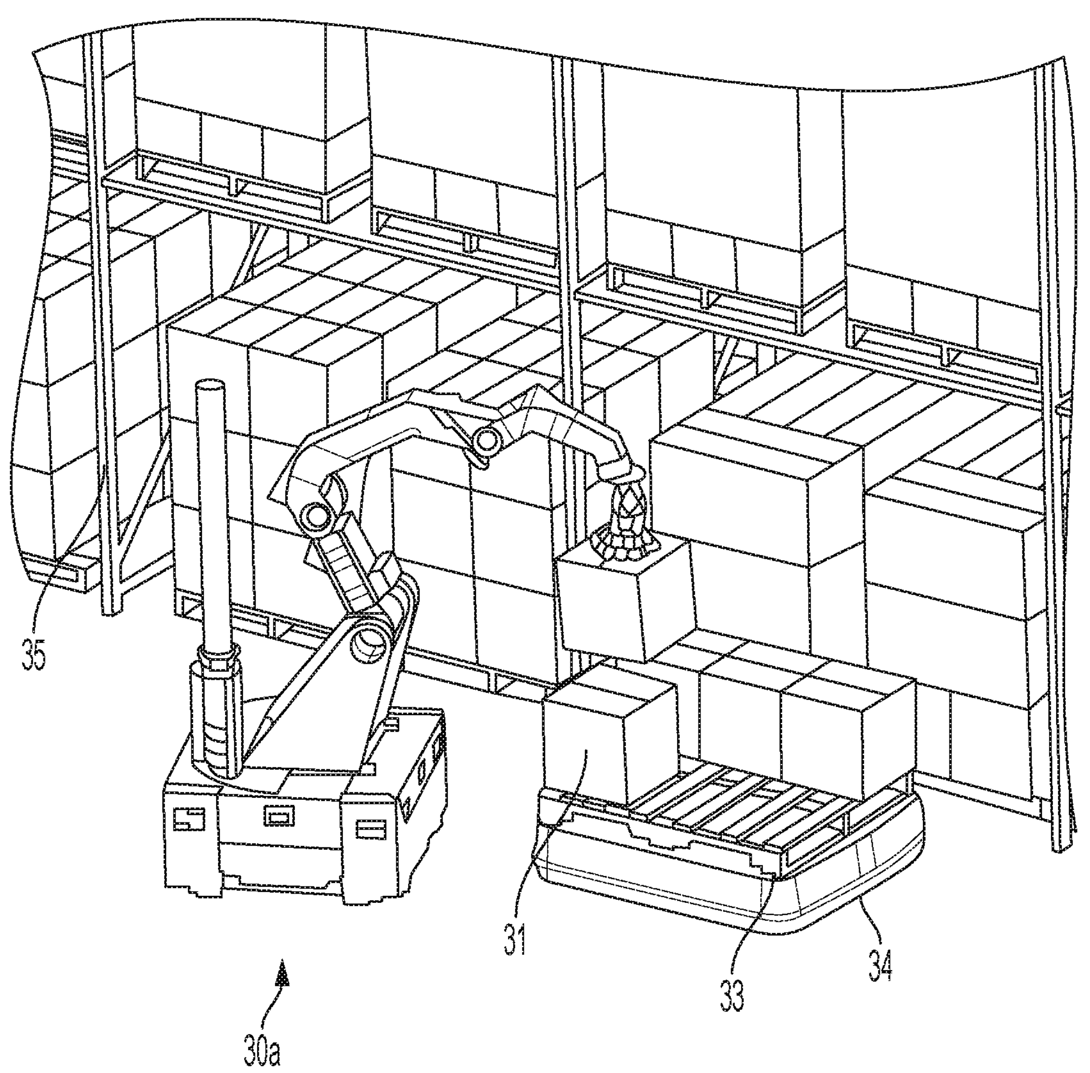
FIG. 8C depicts a robot building a pallet in a warehouse aisle.

FIG. 8C depicts a robot 30*a* performing an order building task, in which the robot 30*a* places boxes 31 onto a pallet 33. In FIG. 8C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 8A-8C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), interacting with objects in the mobile manipulator's environment, coordinating with other mobile manipulator robots, coordinating with other warehouse robots (e.g., coordinating with AMRs), coordinating with humans, and many other tasks.

Example Perception Mast

Referring to FIGS. 1A and 1B, the robot 100 includes a mobile base 110, a turntable 120, a robotic arm 130 (with an end effector 150) and a perception mast 140, as explained above. The perception mast 140 is implemented as a structural support rigidly coupled to a surface of the robot (e.g., the turntable 120) and includes a plurality of perception modules 142 arranged thereon. In box picking applications, in which the robot 100 will repetitiously pick a box, rotate, place the box, and rotate back to pick the next box, the perception mast 140 may be configured to rotate independent of rotation of the turntable 120 on which it is mounted to enable cameras included in the perception modules 142 to capture images of the environment that enable the robot 100 to plan its next movement while simultaneously executing a current movement. For example, while the robot 100 is picking a first box, the perception modules 142 on the perception mast 140 may point at and gather information about the location where the first box is to be placed (e.g. a pallet, a conveyor belt). Then, while the robot 100 is placing the first box, the perception mast 140 may be rotated such that the perception modules 142 on the perception mast 140 point at the stack of boxes and gather information about the second box to be picked. In this way, the robot 100 may parallelize tasks which may otherwise have been performed sequentially, thus enabling faster and more efficient execution of tasks.

It should be appreciated that capturing images of the robot's environment includes not only capturing images about the task that the robot is performing (e.g., images of a stack of boxes or the area surrounding a pallet or conveyor), but also capturing images of the robot's environment that will ensure the robot is operating safely. For instance, when the robot is operating within a container (e.g., a truck) to unload boxes or other objects from the container. The perception modules 142 arranged on the perception mast 140 may be configured to image the walls and ceiling of the container to ensure that the robot components (e.g., mobile base and/or robotic arm) can operate safely and effectively within the container.

In the example described above, the perception mast is rotated away from where the robotic arm is operating to facilitate planning a next movement by the robotic arm while the robotic arm is performing a current movement (e.g., to enable movement planning one frame in advance). However, the inventors have recognized that capturing images of the robot arm itself may also be advantageous in certain scenarios. For instance, capturing images of the robotic arm while a calibration sequence is performed may be useful for calibrating the robotic arm and/or one or more of the components of the perception modules arranged on the perception mast. Additionally, capturing information about an object (e.g., a box) that the robotic arm has picked may be useful in determining one or more characteristics about the object that may help inform future actions by the robot. For instance, the dimensions of a box picked by the robotic arm may be useful in helping plan how to pick similarly-dimensioned boxes located in a stack of boxes being unloaded from a container, such as a truck.

Figure 2A:
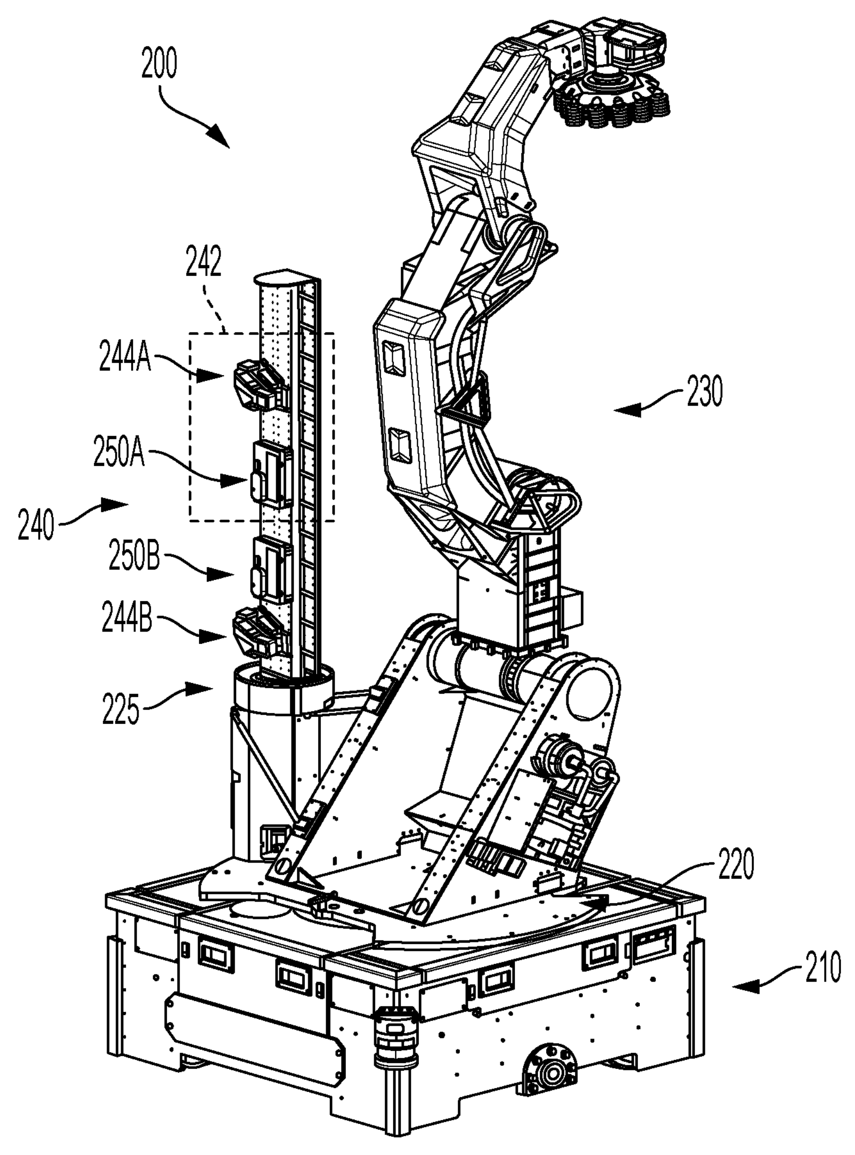
FIG. 2A is a perspective view of another embodiment of a robot.
Figure 2B:
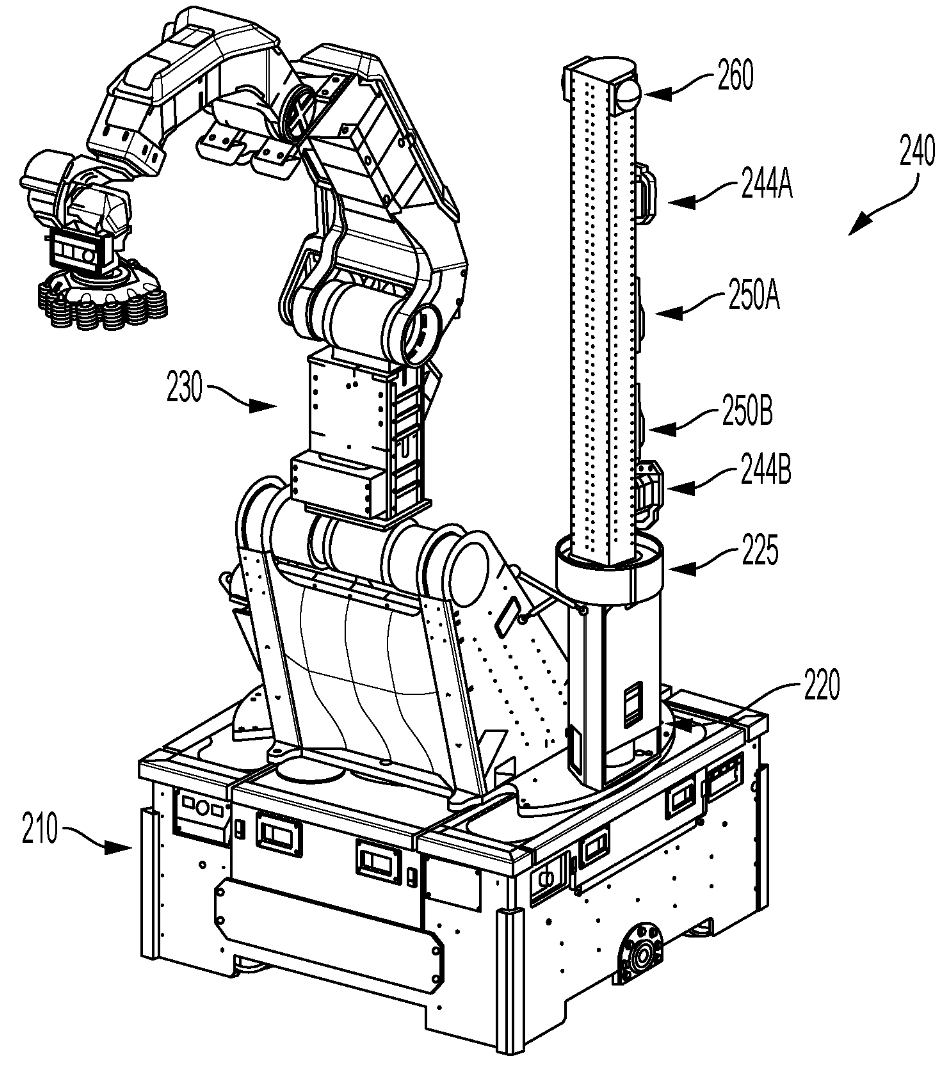
FIG. 2B is another perspective view of the robot of FIG. 2A.

FIGS. 2A and 2B are perspective views of a robot 200 designed in accordance with some embodiments. The robot 200 includes a mobile base 210 and a turntable 220 rotatably coupled to the mobile base. A robotic arm 230 is operatively coupled to the turntable 220, as is a perception mast 240. The perception mast 240 includes an actuator 225 configured to enable rotation of the perception mast 240 relative to the turntable 220 and/or the mobile base 210. In some embodiments, the perception mast 240 may include components not directly related to perception sensing of the robot's environment including, but not limited to, one or more communication systems and safety lights (e.g., light 260 shown in FIG. 2B).

As shown, the perception mast 240 includes a plurality of perception modules 242 arranged vertically along the perception mast. Each of the perception modules 242 includes a two-dimensional (2D) camera and a depth sensor. For instance, the upper perception module 242 includes upper 2D camera 244A and upper depth sensor 250A. The 2D camera and the depth sensor included in a perception module may be arranged in any suitable way. For instance, although upper depth sensor 250A is shown as being arranged below upper 2D camera 244A, it should be appreciated that the upper depth sensor 250A may alternatively be arranged above upper 2D camera 244A or co-located at the same height along perception mast 240 as 2D camera 244A.

As shown, perception mast 240 also includes a lower perception module including lower 2D camera 244B and lower depth sensor 250A. The lower perception module is arranged along the same side of the perception mast 240 as the upper perception module and is located between the upper perception module and the actuator 255. The inventors have recognized that having multiple perception modules located on the perception mast 240 at different locations (e.g., near the top and bottom of the perception mast) provides the robot 200 with imaging capabilities not possible when only a single perception module is included. For instance, the sensors within the upper perception module may have a different field of view that is non-overlapping (or partially overlapping) with the field of view of the sensors within the lower perception module such that the combined field of view of both perception modules is larger than each individual perception module's field of view. Such an expanded field of view may be useful to image a tall stack of boxes or other objects in the environment with which the robot is to interact. Additionally, images captured by the sensors of one of the perception modules may include characteristics of objects in the environment that are not well captured by the sensors of another of the perception modules. For instance, the sensors of the upper perception module may capture more detail about characteristics of objects in the environment located at a same or similar height as the upper perception module compared to sensors of the lower perception module, which may capture one or more characteristics of the same objects, but at more of an angle. As another example, the sensors of the lower perception module may capture more detail about objects located near the mobile base of the robot than the sensors of the upper perception module.

In some embodiments, one or both of the 2D camera and the depth sensor included within a perception module may have a fixed orientation (e.g., they may not actively pan and/or tilt). Additionally, the sensors within the upper and lower perception modules may be oriented at the same angle relative to the perception mast 240 or may be oriented at different angles relative to the perception mast to capture a desired field of view. For instance, the sensors of the upper perception module may be oriented to capture information about the environment at an angle of 90° relative to the vertical axis of the perception mast 240, whereas the sensors of the lower perception module may be oriented to capture information about the environment at an angle of 70° relative to the vertical axis of the perception mast 240 (i.e., facing downward toward the mobile base) to enable capture of information located near the mobile base. As shown, in some embodiments, the lower perception module may be arranged along the perception mast 240 at a location above actuator 255 that enables capture of information near the mobile base, but without including the mobile base itself (or including only limited portions of the mobile base) in the captured information.

Figure 3:
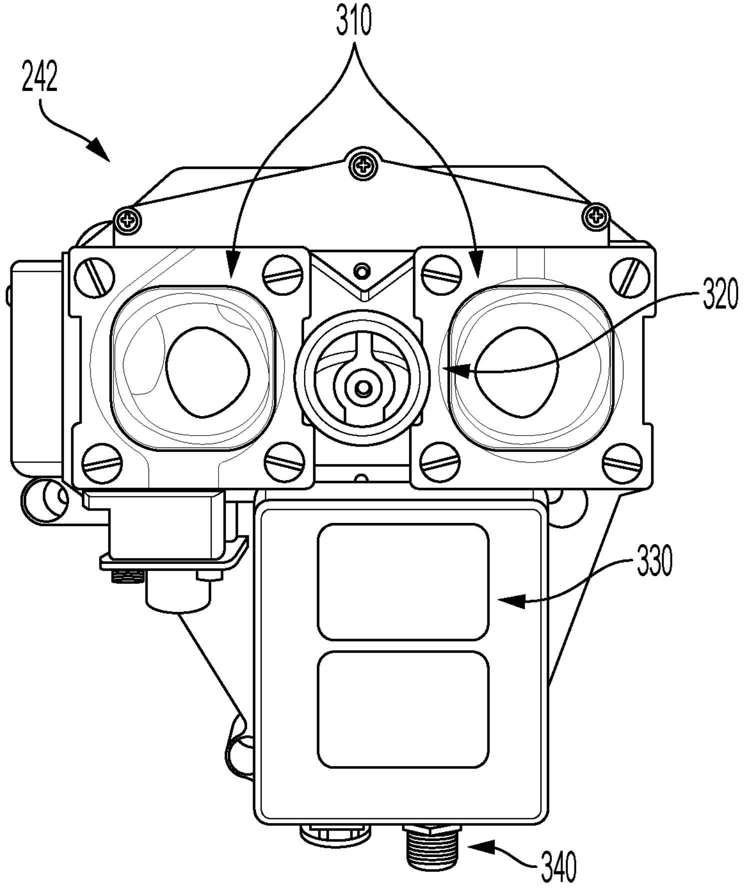
FIG. 3 illustrates components of a perception module designed in accordance with some embodiments.

FIG. 3 illustrates components of a perception module 242 that may be used in accordance with some embodiments. The perception module includes light sources 310 (e.g. flash-based light sources) and 2D camera 320 arranged proximate to the light sources 310. Examples of 2D camera 320 include, but are not limited to, red-green-blue (RGB) cameras, monochrome cameras, prism cameras, or any other type of 2D camera configured to capture a 2D image of an environment.

Light sources 310 are configured to provide active illumination to the environment during capture of an image by 2D camera 320 and may include any suitable light generation elements including, but not limited to, light emitting diodes (LEDs). As shown, perception module 242 includes two light sources arranged to surround 2D camera 320. Such an orientation may be advantageous to ensure that objects in the environment are illuminated uniformly and to minimize shadows during capture of images by the 2D camera. It should be appreciated however, that any suitable number of light sources 310 arranged in any suitable way may be used, and the disclosure is not limited in this respect. The inventors have recognized that including one or more on-board light sources enables a mobile manipulation robot to capture images of the environment without the need to have a suitable level of ambient light present in the area within which the robot is operating. Providing on-board light sources also helps eliminate shadows that may exist in the environment. This is particularly important for tasks in which the robot is located within a container such as a truck in which there is not typically much ambient lighting.

Perception module 242 also includes depth sensor 330 configured to capture depth information related to objects in the environment. Examples of depth sensor 330 include, but are not limited to, a stereoscopic camera, a time-of-flight camera, LiDAR, or any other depth sensor configured to capture depth information about the environment. In one embodiment, perception module 242 includes two LED-based light sources 310, an RGB monocular camera 320 and a time-of-flight camera 330. As noted above, the arrangement of the particular components within perception module 240 is not limiting, and the components may be arranged in any suitable manner. Preferably the 2D camera 320 and the depth sensor 330 are arranged to provide a similar field of view, which facilitates registration of the information captured by the 2D camera and the depth sensor, as discussed in more detail below.

In some embodiments, each of the light sources 310, 2D camera 320 and depth sensor 330 is electrically coupled to control circuitry configured to control a timing of operation of the individual components. For instance, the perception module may include hardware control circuitry electrically coupled to one or more of the components within the perception module to enable individual control of each component based on electrical signals provided by the control circuitry. In some embodiments, multiple of the components in the perception module may be electrically connected to each other such that triggering operation of one component automatically triggers operation of another component electrically connected to it without having to separately send a signal from the control circuitry to the another component to control its operation. As shown in FIG. 3, connector 340 may be configured to receive and/or transmit signals between the components of the perception module 242 and control circuitry and/or processing circuitry located external to the perception module. For instance, connector 340 may be configured to couple perception module 242 to control circuitry to perform synchronization and/or triggering of one or more of the perception module components. Additionally, connector 340 may be configured to couple power circuitry located on the robot to one or more components of a perception module such that operating power may be provided to the components of the perception module.

In some embodiments, the perception mast 240 may include control circuitry configured to control a timing of operation of sensors within each of multiple perception modules (e.g., the upper perception module and the lower perception module). Such centralized control circuitry may enable coordinated control across perception modules to facilitate capturing information from all of the sensors located therein simultaneously or near simultaneously. In other instances, the coordinated control across perception modules may help reduce cross-talk between the two perception modules. For instance, to detect distance information time-of-flight cameras typically emit pulses of infrared (IR) radiation and detect reflections of the emitted IR radiation from objects in the environment. Centralized control circuitry is used in some embodiments to stagger the timing of the IR radiation emitted for the two time-of-flight cameras arranged on the perception mast such that a respective time-of-flight sensor only senses reflections that correspond to its IR emitter and not from the IR emitter from the other time-of-flight sensor.

Figure 4:
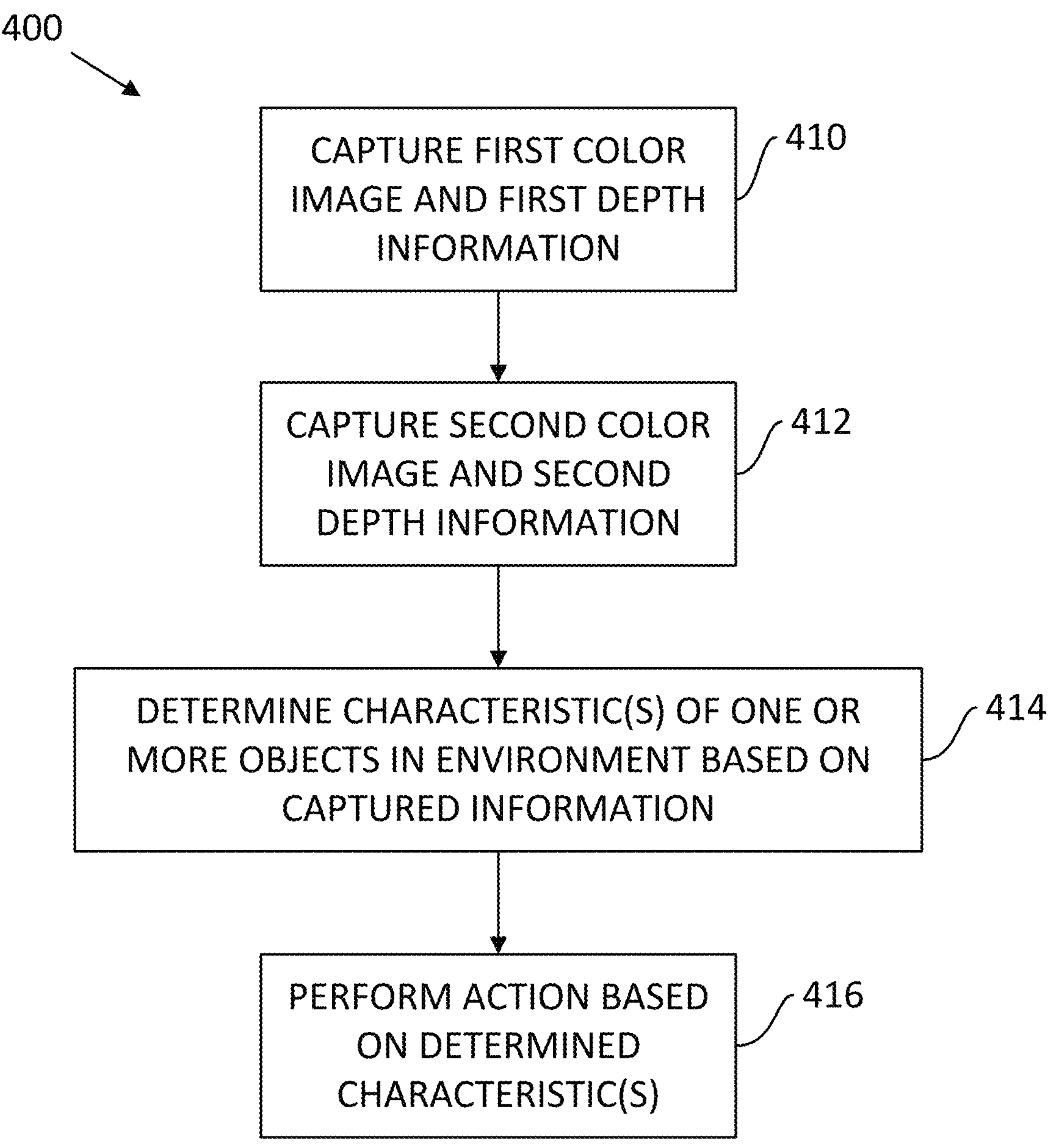
FIG. 4 is a flowchart of a process for determining one or more characteristics of objects in the environment of a robot in accordance with some embodiments.

FIG. 4 illustrates a process 400 for determining one or more characteristics of objects in an environment using a plurality of perception modules arranged on a perception mast of a mobile manipulator robot designed in accordance with some embodiments. In act 410, a first color image and first depth information is captured by a first 2D camera (e.g., upper camera 244A) and a first depth sensor (e.g., upper depth sensor 250A) of a first perception module (e.g., upper perception module 244). For instance, in an example of picking boxes from a stack, the first color image and first distance information may represent information about boxes in the top portion of the stack. The process then proceeds to act 412, where a second color image and second depth information is captured by a second 2D camera (e.g., lower camera 244B) and a second depth sensor (e.g., lower depth sensor 250B) of a second perception module (e.g., the lower perception module). Continuing with the box picking example, the second color image and the second depth information may include information about boxes in the bottom portion of the stack, such that a combination of the information captured by the first perception module and the second perception module provides information for a vertical slice of the stack of boxes. Although shown as being performed sequentially in the process 400 of FIG. 4, it should be appreciated that acts 410 and 412 may be performed sequentially or at least partially in parallel using any suitable control strategy, examples of which are described herein.

After capturing 2D color and depth information from each of the plurality of perception modules, process 400 proceeds to act 414, where one or more characteristics of one or more objects in the environment are determined based on the captured information. Continuing with the box picking example, the characteristics may include faces of boxes in the stack using a box detection model trained to identify the faces of boxes in a stack based on the captured information. For other tasks or scenarios, the characteristic(s) determined in act 414 may be different. For instance, when the mobile manipulator robot is driving down an aisle of a warehouse, the perception modules may be configured to capture information, and the captured information may be used to detect obstructions in the robot's path, visual identifiers (e.g., barcodes located in the environment), or any other suitable characteristics of objects in the environment. Illustrative examples of how the captured information is combined to determine object characteristics is described in further detail below. After determining the one or more characteristics of objects in the environment, process 400 proceeds to act 416 where one or more actions are performed based on the determined characteristic(s). Returning to the box picking example, after box faces in a stack are identified in act 414, the action performed in act 416 may include one or more of determining a next box in the stack to pick, updating a trajectory plan for the manipulator arm of the robot to pick a next box in the stack, determining whether to pick the next box in the stack using a top pick or a face pick, or controlling the manipulator arm of the robot to pick the next box in the stack. Of course, additional or alternative actions may also be performed depending on the task the robot is currently performing or will perform next. For instance, the object with which the manipulator arm may interact with next may not be arranged in a stack, but may be located in any configuration in the environment of the robot.

In the examples above, 2D images and depth information is captured while the perception mast and the mobile base are stationary (e.g., not rotating or moving, respectively). However, in some embodiments, the plurality of perception modules are configured to capture 2D images and depth information as the perception mast and/or mobile base of the mobile manipulator robot is moving. For instance, in the box picking example the mobile robot may be located close to the stack of boxes to enable the robotic arm to pick boxes from the stack. However, locating the robot close to the stack of boxes also limits the field of view of the sensors in the perception modules such that the width of the entire stack may not fit within the field of view when the perception mast is stationary. To ensure that the entire width of the entire stack is considered when identifying boxes in the stack to, for example, determine a next box to pick, the perception mast may be rotated from left to right (or right to left), and while the perception mast is moving (or during short pauses between movements) the perception modules may capture information for multiple points in space that collectively cover the entire width of the stack of boxes. In some embodiments, the captured information may be stitched together into a single image that is provided to a trained box detection model (or other trained model depending on the particular task being performed by the robot). In other embodiments, each captured image may be provided separately to the box detection model and the results of the output for the model for each image may be considered together to perform box detection. Capturing images during movement of the perception mast and/or the mobile base may also be advantageous for other tasks, such as capturing perception information as the robot drives down an aisle of a warehouse to facilitate navigation of the robot and/or to detect markers located on physical surfaces in the warehouse to provide the robot with information that may inform its operation.

Figure 5:
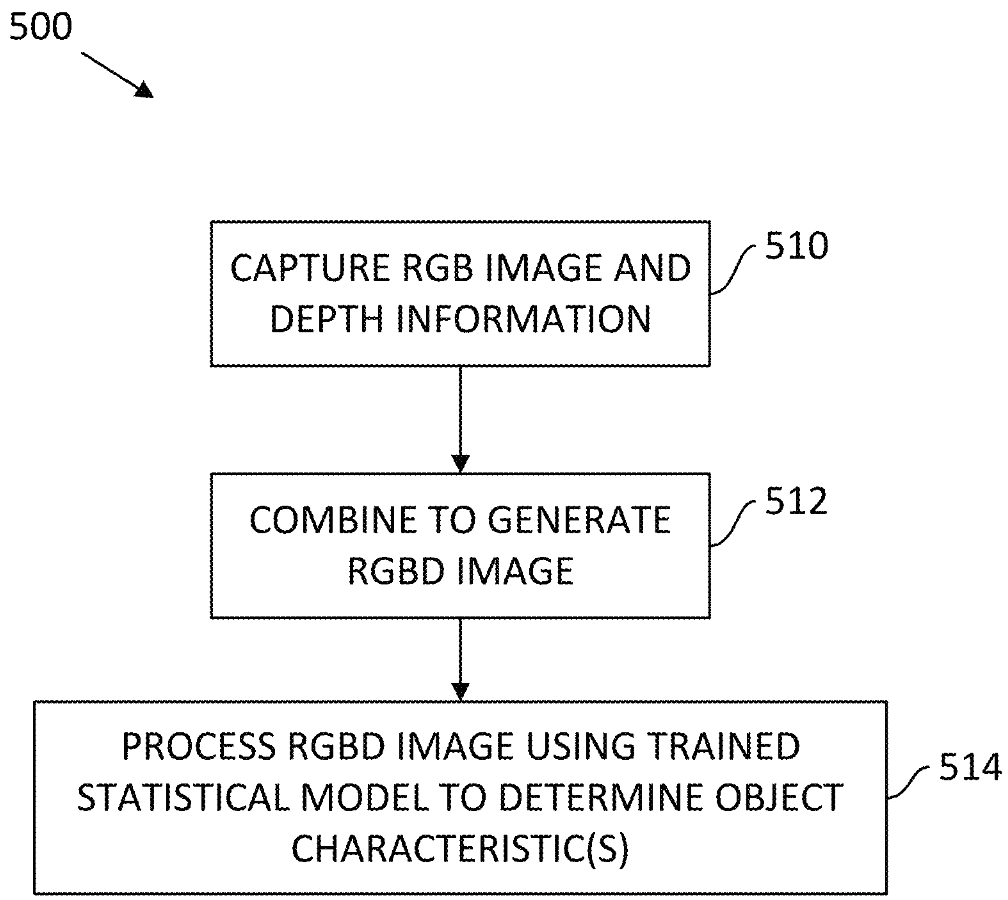
FIG. 5 is a flowchart of a process for determining one or more characteristics of objects in the environment of a robot in accordance with some embodiments.

FIG. 5 illustrates a process 500 for combining information captured from a perception module that includes an RGB monocular camera and a time-of-flight (TOF) depth sensor to determine one or more characteristics of objects in the environment. In act 510, an RGB image is captured from the RGB monocular camera and depth information is captured by the TOF depth sensor in the perception module. Process 500 then proceeds to act 512, where the RGB image and the depth information is combined to generate an RGBD image. The RGBD image may be conceptualized as a high-fidelity colorized 3D point cloud, which includes both color appearance as well as depth data and 3D geometric structure of objects in the environment. In some embodiments, the RGB image and the depth information are combined by registering the RGB image and the depth information to create the RGBD image. As part of the registration process distortion in one or both of the color image and the depth information caused, for example, by motion of the mobile robot or objects in the environment, may be corrected. Several other factors may additionally or alternatively be taken into account to properly register the RGB image and the depth information. For example, these factors include the intrinsic properties of the cameras (e.g., focal lengths, principal points of the cameras) and the extrinsic properties of the cameras (e.g., the precise position and orientations of the RGB camera and the TOF depth sensor camera with respect to each other). A calibration sequence executed for each set of sensors in a perception module may be performed to determine these intrinsic and extrinsic properties for use in registering the RGB image and the depth information to generate an RGBD image in act 512 of process 500.

Process 500 then proceeds to act 514, where one or more characteristics of objects in the environment are determined based on the RGBD image generated in act 512. In some embodiments, the RGBD image is provided as input to a trained statistical model (e.g., a machine learning model) that has been trained to identify the one or more characteristics. For instance, in the box picking example, the statistical model may be trained to recognize surfaces (e.g., faces) of boxes arranged in a stack. In another example, the statistical model may be trained to recognize other object characteristics such as the shape of signs, a category or type of object in the path of motion of the robot, or any other characteristic of one or more objects in the environment. Any suitable type of trained statistical model may be used to process an RGBD image and output one or more characteristics of object(s) in the environment.

The inventors have recognized that carefully controlling the timing of operation of the sensors both within a perception module and across multiple perception modules is important to ensure that an accurate colorized point cloud (also referred to as an "RGBD image" herein) can be generated without substantial distortions due to motion of the robot or in the environment. To this end, some embodiments include control circuitry configured to trigger the operation of the components in a perception module to collect sensor data at precisely the time when it is desired (e.g., when the perception module is oriented towards an object of interest) rather than continuously recording images in a loop, and then processing through all the recorded images to identify the images of interest. Focusing capture of images only when they are needed reduces power consumption of the perception modules and the computational resources needed to process the images.

Additionally, the inventors have also recognized that synchronization across the sensors in multiple, closely arranged perception modules is important to prevent interference in multiple ways across the sensors. For instance, in some embodiments, operation of the light sources in multiple perception modules is staggered (e.g., using a delay) such that the active illumination provided by one perception module does not cast shadows in the images captured by another perception module. In some embodiments, the delay between when light source(s) within a first perception module are triggered and when light source(s) within a second perception module are triggered is between 50-100 ms.

Furthermore, the timing of operating the depth sensors across multiple perception modules is synchronized (e.g., using a delay) in some embodiments to prevent interference between the depth sensors. As discussed above, some embodiments use time-of-flight (TOF) sensors as the depth sensors included in perception modules. In such embodiments, the TOF sensor emits a sequence of infrared (IR) light pulses and senses IR radiation reflected from objects in the environment to infer depth information about the objects in the environment. If multiple TOF sensors operate at the same time, the IR light pulse emissions can interfere with each other and distort the reflected emissions that are sensed by the TOF sensors. In some embodiments, this distortion is prevented by sequentially operating depth sensors across perception modules to ensure that the first perception module has completed capture of the depth information prior to emitting IR radiation from the second perception module. An advantage of this approach is that it can be assured that the emissions provided by the first TOF sensor will not be captured by the second TOF sensor and vice versa. However, requiring sequential operation of the depth sensors takes longer than operating the TOF sensors at least partially in parallel, which may be an important consideration for some tasks performed by the mobile manipulation robot described herein. An alternative synchronization approach for preventing interference between TOF sensors that allows the sensors to operate in parallel is to sequence and interleave the individual IR pulses emitted from the sensors. For example, depth sensor A may be configured to emit its first IR light pulse. After sensor A senses the reflected signals corresponding to the first IR light pulse and the received signals are being processed, sensor B may be configured to emit its first IR light pulse. The IR light pulses between sensors can be interleaved until both sensors complete collecting data. In this way, the total effective exposure time of the sensors is reduced, which improves the quality and time consistency of the sensor data without sacrificing the operational speed of the robot.

Figure 6:
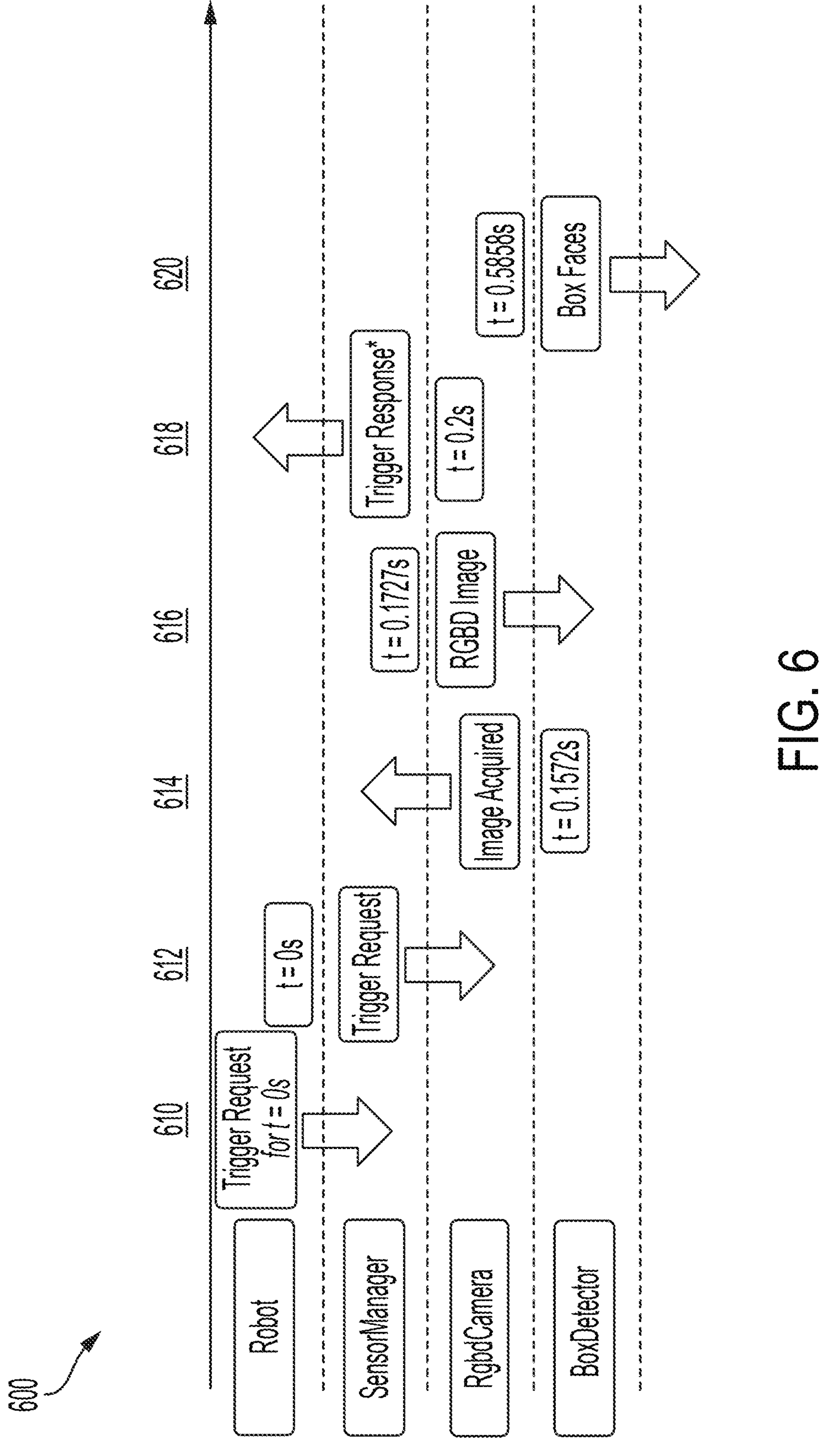
FIG. 6 is a timing diagram of a process for detecting box faces in an environment of a robot in accordance with some embodiments.

FIG. 6 illustrates a timing diagram 600 for controlling operation of components of a perception module (e.g., using control circuitry as discussed above) in accordance with some embodiments. In act 610, it is determined that the robot wants to take a picture and control circuitry sends a trigger request signal to sensor manager software executing on a processor. In act 612, the sensor manager receives the request and generates a request to trigger one or multiple of the 2D cameras and depth sensors included in one or more perception modules arranged on the perception mast. In act 614, the RGBD camera software receives the request generated in act 612 and interfaces with the appropriate camera(s) and depth sensor(s) to begin capture of the corresponding information. Upon completion of the information capture, the triggered cameras and depth sensors respond back to the sensor manager software indicating completion of the information capture. An RGBD image is then generated, for example, based on the captured information, as discussed in connection with the process of FIG. 5. In act 616 the generated RGBD image is provided to a trained statistical model (e.g., labeled BoxDetector in FIG. 6) for processing and determination of one or more characteristics of objects in the environment. It should be appreciated that the generated RGBD image may also be provided to other robot systems if desired. In act 618, the trained statistical model (e.g., BoxDetector) outputs one or more characteristics of objects in the environment (e.g., identified surfaces of boxes), and information about the characteristic(s) is provided to the control circuity to perform one or more actions based, at least in part, on the identified characteristic(s).

Figure 7:
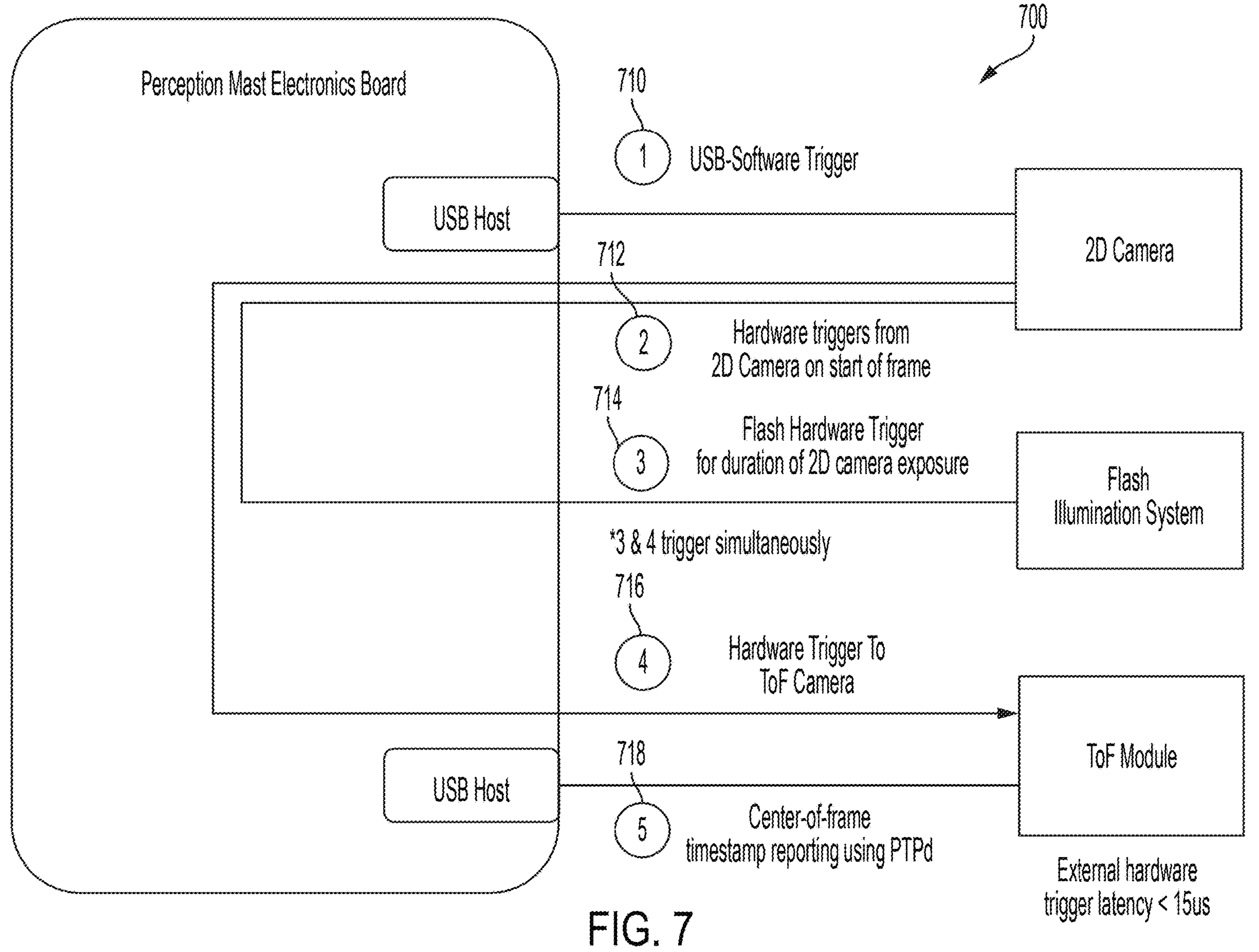
FIG. 7 illustrates a process for operating components of a perception module of a robot in accordance with some embodiments.

FIG. 7 illustrates an example of a process 700 for controlling components of a perception module in accordance with some embodiments. As discussed above, some embodiments include hardware control circuitry (referred to in FIG. 7 as "Perception Mast Electronic Board") disposed within the perception mast on which the plurality of perception modules are arranged. The control circuitry includes one or more communications ports (e.g., universal serial bus (USB) ports) that enable communications between the control circuitry and one or more of the components of a perception module. When the robot determines that an image should be captured, process 700 begins in act 710, where control circuity issues a trigger to a 2D camera (e.g., 2D camera 320 in FIG. 3) of a perception module arranged on the perception mast. Process 700 then proceeds to act 712, where upon the start of capturing an image frame, the 2D camera issues a trigger to a flash illumination system (e.g., light sources 310 in FIG. 3) such that the light sources provide illumination of the environment during capture of the 2D image. Process 700 then proceeds to act 714, where upon the start of capturing an image frame, the 2D camera also issues a trigger to the depth sensor (e.g., time-of-flight sensor 330 in FIG. 3) to instruct the depth sensor to capture depth information. In some embodiments in which the light source(s) are configured to produce visible light and the depth sensor is configured to transmit and receive infrared light, capture of an image of the environment by the 2D camera illuminated by the light source(s) and capture of depth information about the environment by the depth sensor can occur simultaneously due to the different spectra of light used for the two types of sensors. Accordingly, acts 714 and 716 may be performed at the same time such that the 2D camera, the light source(s) and the depth sensor are all configured to operate simultaneously or near simultaneously. Process 700 then proceeds to act 718, where a timestamp (e.g., corresponding to a time of the center of capture of a frame) is provided from the depth sensor to the control circuitry, such that a time of capture can be associated with the 2D image and the depth information.

Control of one or more operations of a perception module may be accomplished using one or more computing devices located on-board the mobile manipulator robot. For instance, one or more computing devices may be located within a portion of the mobile base with connections extending between the one or more computing devices and components within the perception mast. In some embodiments, the one or more computing devices may be coupled to dedicated hardware within the perception mast configured to send control signals (e.g., trigger signals) to particular components of a perception module, examples of which are provided with reference to FIGS. 7 and 8.

Figure 9:
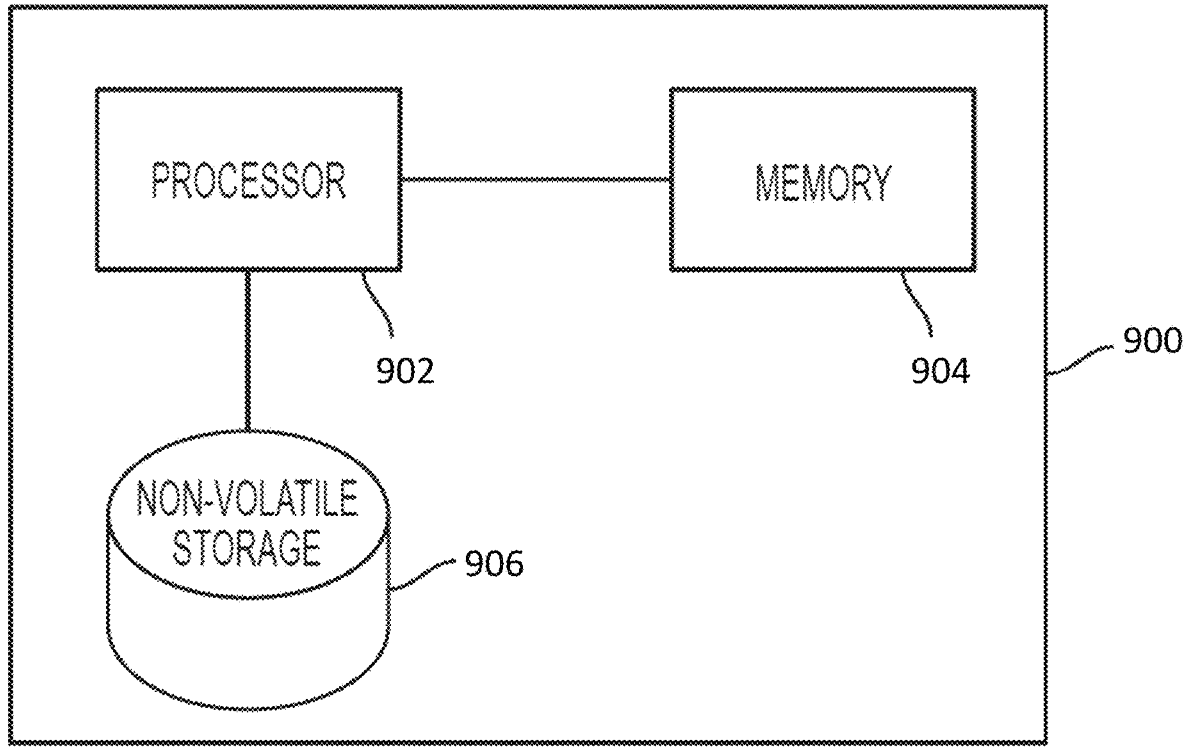
FIG. 9 illustrates an example computer on which some embodiments may be implemented.

An illustrative implementation of a computing system that may be used in connection with any of the embodiments of the disclosure provided herein is shown in FIG. 9. For example, any of the computing devices described above may be implemented as computing system 900. The computer system 900 may include one or more computer hardware processors 902 and one or more articles of manufacture that comprise non-transitory computer-readable storage media (e.g., memory 904 and one or more non-volatile storage devices 906). The processor 902(*s*) may control writing data to and reading data from the memory 904 and the non-volatile storage device(s) 906 in any suitable manner. To perform any of the functionality described herein, the processor(s) 902 may execute one or more processor-executable instructions stored in one or more non-transitory computer-readable storage media (e.g., the memory 904), which may serve as non-transitory computer-readable storage media storing processor-executable instructions for execution by the processor(s) 902.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A mobile robot comprising:
- a mobile base including a set of wheels;
- a turntable coupled to the mobile base, the turntable configured to rotate relative to the mobile base;
- an imaging apparatus comprising:
  - a structural support rigidly coupled to a surface of the turntable at a first location, the structural support extending from the surface of the turntable in a first direction;
  - a plurality of perception modules, each of which is arranged on the structural support to have a different field of view and includes:
    - a two-dimensional (2D) camera configured to capture a color image of an environment;
    - a depth sensor configured to capture depth information of one or more objects in the environment;
    - at least one light source configured to provide illumination to the environment; and
  - control circuitry configured to control a timing of operation of the 2D camera, the depth sensor, and the at least one light source included in each of the plurality of perception modules;
- a robotic arm coupled to the surface of the turntable at a second location different from the first location, the robotic arm extending from the surface of the turntable in the first direction; and
- at least one computer processor configured to:
  - process the color image and the depth information to identify at least one characteristic of one or more objects in the environment; and
  - control an operation of the robotic arm based, at least in part, on the identified at least one characteristic.

2. The mobile robot of claim 1, wherein the depth sensor comprises a time-of-flight (TOF) camera.

3. The mobile robot of claim 1, wherein the depth sensor comprises a stereoscopic camera.

4. The mobile robot of claim 1, wherein the 2D camera comprises a red-green-blue (RGB) monocular camera.

5. The mobile robot of claim 1, wherein the plurality of perception modules are configured to capture corresponding color images and depth information as the turntable rotates.

6. The mobile robot of claim 1, wherein the plurality of perception modules include a first perception module and a second perception module, and wherein the first perception module and the second perception module are arranged vertically along a same side of the structural support.

7. The mobile robot of claim 1, wherein processing the color image and the depth information comprises:
- registering the color image and the depth information to create a combined image; and
- identifying the at least one characteristic of one or more objects in the environment based, at least in part, on the combined image.

8. The mobile robot of claim 7, wherein registering the color image and the depth information comprises correcting for distortion in one or both of the color image and the depth information.

9. The mobile robot of claim 7, wherein identifying the at least one characteristic of one or more objects in the environment based, at least in part, on the combined image comprises providing the combined image as input to a statistical model trained to identify the at least one characteristic.

10. The mobile robot of claim 9, wherein the at least one characteristic includes one or more surfaces of the one or more objects in the environment.

11. The mobile robot of claim 1, wherein the at least one computer processor is further configured to select, from among the one or more objects in the environment, a next object to interact with, and wherein controlling an operation of the robotic arm comprises controlling an operation of the robotic arm to cause the robotic arm to interact with the selected next object.

12. The mobile robot of claim 11, wherein the at least one computer processor is further configured to determine whether to interact with a top surface or a face surface of the selected next object, and wherein controlling the operation of the robotic arm comprises controlling an operation of the robotic arm to cause the robotic arm to interact with the determined top surface or face surface of the selected next object.

13. The mobile robot of claim 1, wherein the 2D camera is electrically connected to the depth sensor and the at least one light source, the control circuitry is configured to trigger a start of operation of the 2D camera, and the 2D camera is configured to trigger a start of operation of the at least one light source and the depth sensor.

14. The mobile robot of claim 1, wherein the plurality of perception modules includes a first perception module and a second perception module, and wherein the control circuitry is configured to trigger a start of operation of one or more components within the first perception module at a first timepoint and trigger a start of operation of one or more components within the second perception module at a second timepoint after the first timepoint.

15. The mobile robot of claim 14, wherein triggering a start of operation of one or more components within the first perception module at a first timepoint and triggering a start of operation of one or more components within the second perception module at a second timepoint after the first timepoint comprises:

triggering the at least one light source of the first perception module at the first timepoint and triggering the at least one light source of the second perception module at the second timepoint.

16. The mobile robot of claim 15, wherein a time between the first timepoint and the second timepoint is between 50-100 ms.

17. The mobile robot of claim 1, wherein the environment comprises an inside of a container, and wherein the at least one characteristic comprises one or more of a side of the container and a top of the container.

18. The mobile robot of claim 1, wherein the environment includes the robotic arm of the mobile robot.

19. The mobile robot of claim 18, wherein the at least one characteristic comprises one or more dimensions of an object coupled to an end effector of the robotic arm of the mobile robot.

20. The mobile robot of claim 18, wherein the at least one computer processor is further configured to calibrate the mobile robot based, at least in part, on the identified at least one characteristic.

21. The mobile robot of claim 20, wherein calibrating the mobile robot comprises calibrating the robotic arm of the mobile robot and/or calibrating one or more components of each of the plurality of perception modules.

22. The mobile robot of claim 1, wherein the environment does not include the robotic arm of the mobile robot.

23. The mobile robot of claim 1, wherein the at least one light source comprises a plurality of light sources arranged to at least partially surround the 2D camera.

24. The mobile robot of claim 1, wherein the at least one light source is configured to output light in a visible spectrum, and wherein the depth sensor is configured to emit infrared light.

25. The mobile robot of claim 24, wherein the control circuitry is configured to control a timing of operation of the at least one light source and the depth sensor to start operating simultaneously.

26. The mobile robot of claim 1, wherein the plurality of perception modules includes a first perception module and a second perception module, the first perception module and the second perception module having respective fields of view that at least partially overlap.

27. A method of imaging one or more objects in an environment of a mobile robot, the method comprising:

capturing with a first perception module having a first field of view, a first color image of the environment and first depth information for one or more objects in the environment;

capturing with a second perception module having a second field of view, a second color image of the environment and second depth information for one or more objects in the environment, wherein the first field of view and the second field of view are different, and wherein the first perception module and the second perception module are arranged on a structural support rigidly coupled to a surface of a turntable of the mobile robot at a first location, the turntable configured to rotate relative to a mobile base of the mobile robot, the structural support extending from the surface of the turntable in a first direction;

processing the first color image, the first depth information, the second color image, and the second depth information to identify at least one characteristic of one or more objects in the environment; and controlling an operation of a robotic arm based, at least in part, on the identified at least one characteristic, wherein the robotic arm is coupled to the surface of the turntable at a second location different from the first location, the robotic arm extending from the surface of the turntable in the first direction.

28. The method of claim 27, further comprising controlling an operation of the first perception module and the second perception module such that the first color image and the second color image are captured at different timepoints.

29. The method of claim 27, wherein processing the first color image, the first depth information, the second color image, and the second depth information comprises:

registering the first color image and the first depth information to generate a first combined image;

registering the second color image and the second depth information to generate a second combined image;

providing as input to a statistical model trained to identify the at least one characteristic, the first combined image and the second combined image; and identifying the at least one characteristic based, at least in part, on an output of the statistical model.

* * * * *